(12) United States Patent
Lin

(10) Patent No.: US 10,005,245 B2
(45) Date of Patent: Jun. 26, 2018

(54) METHOD FOR MAKING A CARBON FIBER WHEEL RIM

(71) Applicant: Shu-Wei Lin, Taichung (TW)

(72) Inventor: Shu-Wei Lin, Taichung (TW)

( * ) Notice: Subject to any disclaimer, the term of this patent is extended or adjusted under 35 U.S.C. 154(b) by 337 days.

(21) Appl. No.: 14/831,010

(22) Filed: Aug. 20, 2015

(65) Prior Publication Data

US 2016/0159016 A1   Jun. 9, 2016

(30) Foreign Application Priority Data

Dec. 4, 2014   (TW) .............................. 103142076 A

(51) Int. Cl.
| | |
|---|---|
| *B29C 70/48* | (2006.01) |
| *B60B 5/02* | (2006.01) |
| *B60B 21/02* | (2006.01) |
| *B60B 21/04* | (2006.01) |
| *B60B 21/10* | (2006.01) |

(Continued)

(52) U.S. Cl.
CPC ............ *B29C 70/48* (2013.01); *B29C 70/545* (2013.01); *B29C 70/86* (2013.01); *B60B 5/02* (2013.01); *B60B 21/02* (2013.01); *B60B 21/04* (2013.01); *B60B 21/102* (2013.01); *B60B 21/108* (2013.01); *B60B 25/00* (2013.01); *B29K 2101/10* (2013.01); *B29K 2105/102* (2013.01); *B29K 2307/04* (2013.01); *B29L 2031/32* (2013.01); *B60B 1/003* (2013.01); *B60B 21/062* (2013.01); *B60B 2310/321* (2013.01); *B60B 2310/80* (2013.01); *B60B 2320/14* (2013.01); *B60B 2360/33* (2013.01); *B60B 2360/348* (2013.01); *B60B 2360/3416* (2013.01); *B60B 2360/366* (2013.01); *B60B 2360/368* (2013.01); *B60B 2900/111* (2013.01);

(Continued)

(58) Field of Classification Search
None
See application file for complete search history.

(56) References Cited

U.S. PATENT DOCUMENTS 5,975,645 A   11/1999 Sargent

FOREIGN PATENT DOCUMENTS

| DE | 102005039216 A1 | 2/2007 |
|---|---|---|
| EP | 2030765 A2 | 3/2009 |

(Continued)

OTHER PUBLICATIONS

EP Search Report in corresponding EP application No. 15182627.8 dated Apr. 5, 2016 (7 pages).

(Continued)

*Primary Examiner* — Monica Huson
(74) *Attorney, Agent, or Firm* — Muncy, Geissler, Olds & Lowe, P.C.

(57) ABSTRACT

A method for making a carbon fiber wheel rim includes: preparing an outer supporting piece; winding a carbon-fiber yarn around the outer supporting piece to form carbon fiber layers and to constitute an engaging seat preform; connecting an inner supporting piece to the engaging seat preform; connecting a reinforcement piece to the inner supporting piece; winding a carbon-fiber yarn around an assembly of the engaging seat preform, the inner supporting piece and the reinforcement piece to form carbon fiber layers; fixing the assembly with the carbon fiber layers to form an outer frame preform; and cutting the outer frame preform and the engaging seat preform to form a trench and removing the outer supporting piece therefrom.

9 Claims, 8 Drawing Sheets

(51) Int. Cl.
  *B60B 25/00* (2006.01)
  *B29C 70/54* (2006.01)
  *B29C 70/86* (2006.01)
  *B60B 1/00* (2006.01)
  *B60B 21/06* (2006.01)
  *B29K 101/10* (2006.01)
  *B29K 105/10* (2006.01)
  *B29K 307/04* (2006.01)
  *B29L 31/32* (2006.01)

(52) U.S. Cl.
  CPC ... *B60B 2900/112* (2013.01); *B60Y 2200/134* (2013.01); *Y02T 10/86* (2013.01)

(56) References Cited

FOREIGN PATENT DOCUMENTS

TW    I361148 B1   4/2012
  TW    I371375 B1   9/2012
  TW    I413592 B    11/2013
  TW    I421174 B    1/2014

OTHER PUBLICATIONS

TW Search Report in corresponding TW application No. 103142076 dated Nov. 22, 2015 (2 pages).

METHOD FOR MAKING A CARBON FIBER WHEEL RIM

CROSS-REFERENCE TO RELATED APPLICATION

This application claims priority of Taiwanese Patent Application No. 103142076, filed on Dec. 4, 2014.

FIELD

The disclosure relates to a method for making a wheel rim, more particularly to a method for making a carbon fiber wheel rim.

BACKGROUND

Referring to FIGS. 1 and 2, a conventional method for making a carbon fiber wheel rim includes the steps of: forming a rim frame 10 that is configured to have a substantially U-shaped or triangular cross-section; and attaching an engaging seat 11, which is for engagement with a tire and is configured to have an H-shaped cross-section, onto an annular outer surface of the rim frame 10. The rim frame 10, as well as the engaging seat 11, is formed by interlacingly attaching a plurality of carbon-fiber fabrics 12, which are cut into strips, onto an assembly of an airbag 14 (e.g., as described in Taiwanese Patent No. I434771) and a reinforcement piece 13, followed by heating and pressing the carbon-fiber fabrics 12 to obtain the carbon fiber wheel rim.

However, while attaching the carbon-fiber fabric 12 to form the rim frame 10 and the engaging seat 11, 6 to 8 pieces of the carbon-fiber fabrics 12 are required to be attached onto the assembly for constituting each side surface of the rim frame 10 and the engaging seat 11. In addition, such attachment can only be performed manually, in other words, the process of forming either one of the rim frame 10 and the engaging seat 11 requires attaching the carbon-fiber fabrics 12 for at least 36 times. Such process is time consuming and results in relatively low production efficiency and relatively high production cost. Moreover, carbon fibers in the carbon fiber fabrics 12 do not unidirectionally extend and are discontinued at edges of the carbon-fiber fabrics 12, resulting in decreased mechanical strength at the edges. Furthermore, the interlacing arrangement of the carbon-fiber fabrics 12 may result in an uneven surface profile (e.g., gaps may occur at overlapping sites of the carbon-fiber fabrics 12) and cause formation of bubbles during the heating and pressing step so that production yield is decreased. Even further, the rim frame 10 and the engaging seat 11 are not integrally formed as one piece, thereby decreasing the overall structural strength of the carbon-fiber wheel rim.

Taiwanese Patent No. I382926 discloses another conventional method for making a carbon-fiber wheel rim, including steps of: winding continuously a carbon-fiber strip provided with an adhesive around a circular core; and placing the core with the carbon-fiber strip into a mold, followed by heating and pressing so as to obtain the carbon-fiber wheel rim. However, the carbon-fiber strip is relatively wide and may result in a relatively large amount of folds during the winding process, which may decrease the production yield of the carbon fiber wheel rim.

SUMMARY

Therefore, an object of the disclosure is to provide a method for making a carbon fiber wheel rim that can alleviate at least one of the drawbacks of the prior arts.

According to the disclosure, a method for making a carbon fiber wheel rim, which has a circular engaging seat formed with a circular engaging groove for engagement with a tire, includes: preparing a circular outer supporting piece having a cross-section that is complementary in shape with the circular engaging groove; winding continuously and circumferentially at least one first carbon-fiber yarn around the circular outer supporting piece to form a plurality of first carbon fiber layers, each being formed by winding the first carbon-fiber yarn in a mutually-different winding angle, the circular outer supporting piece and the first carbon fiber layers constituting a circular engaging seat preform; connecting a circular inner supporting piece to the circular engaging seat preform; connecting a circular reinforcement piece to the circular inner supporting piece oppositely of the circular engaging seat preform so that the circular engaging seat preform, the circular inner supporting piece and the circular reinforcement piece constitute an assembly; winding continuously and circumferentially at least one second carbon-fiber yarn around the assembly to form a plurality of second carbon fiber layers, each being formed by winding the second carbon-fiber yarn in a mutually-different winding angle; fixing the assembly with the second carbon fiber layers to form an outer frame preform on the assembly, the outer frame preform having an outer circular surface distal from the circular reinforcement piece; and cutting the outer frame preform and the circular engaging seat preform from the annular outer surface of the outer frame preform to form a circular trench, followed by removing the circular outer supporting piece from the circular trench to form the circular engaging groove of the circular engaging seat and an outer frame.

BRIEF DESCRIPTION OF THE DRAWINGS

Other features and advantages of the disclosure will become apparent in the following detailed description of the exemplary embodiment with reference to the accompanying drawings, of which.

DETAILED DESCRIPTION

Figure 1:
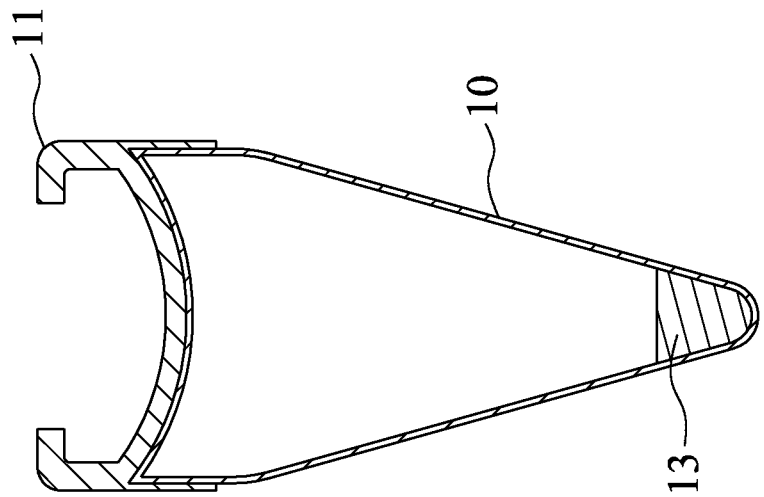
FIG. 1 is a schematic flow chart illustrating a conventional method for making a carbon fiber wheel rim.
Figure 1:
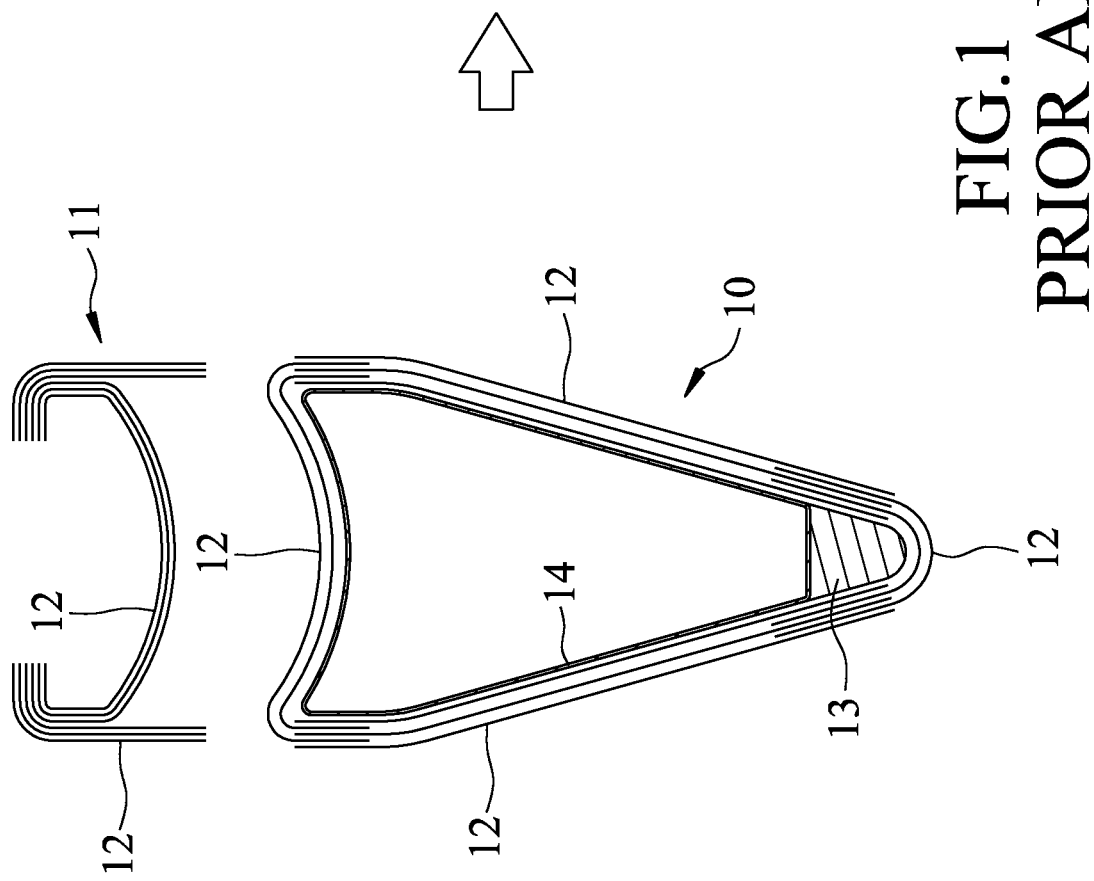
Figure 2:
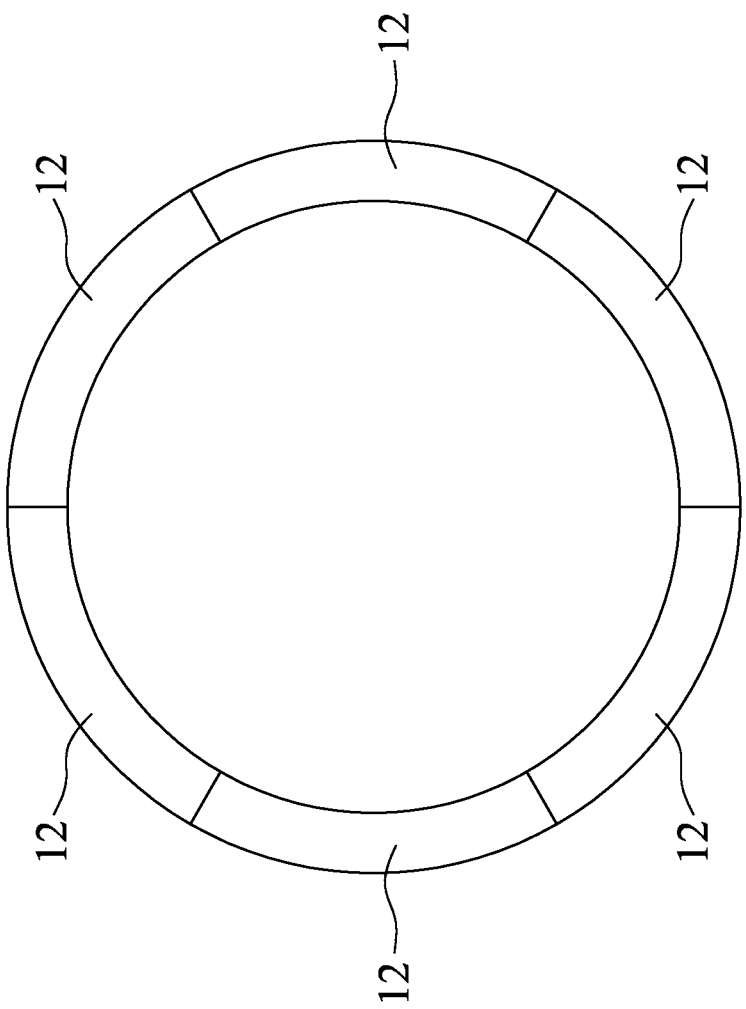
FIG. 2 is a schematic side view, illustrating that the conventional carbon fiber wheel rim is formed by attaching carbon fiber fabrics onto an airbag.
Figure 3:
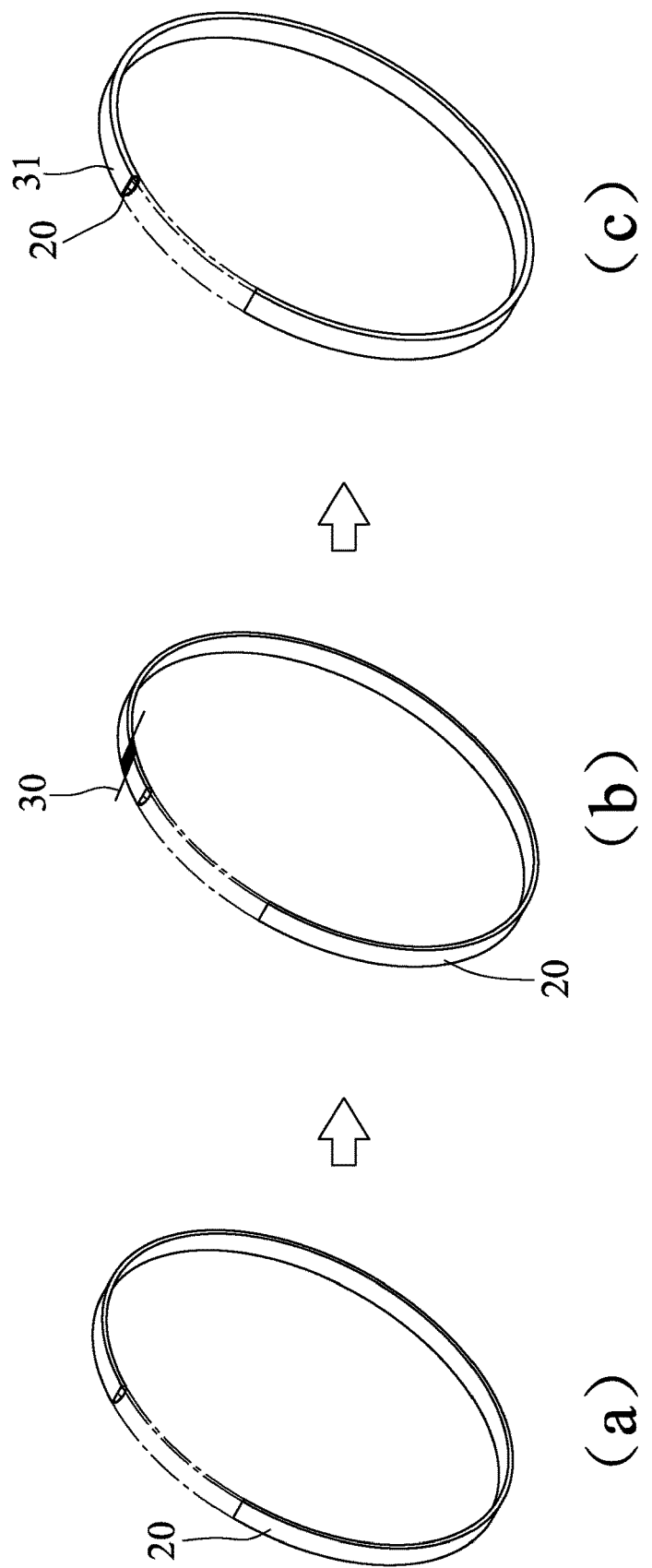
FIGS. 3 to 5 are schematic perspective views of the exemplary embodiment according to the present disclosure, illustrating consecutive steps of a method for making a wheel rim.
Figure 6:
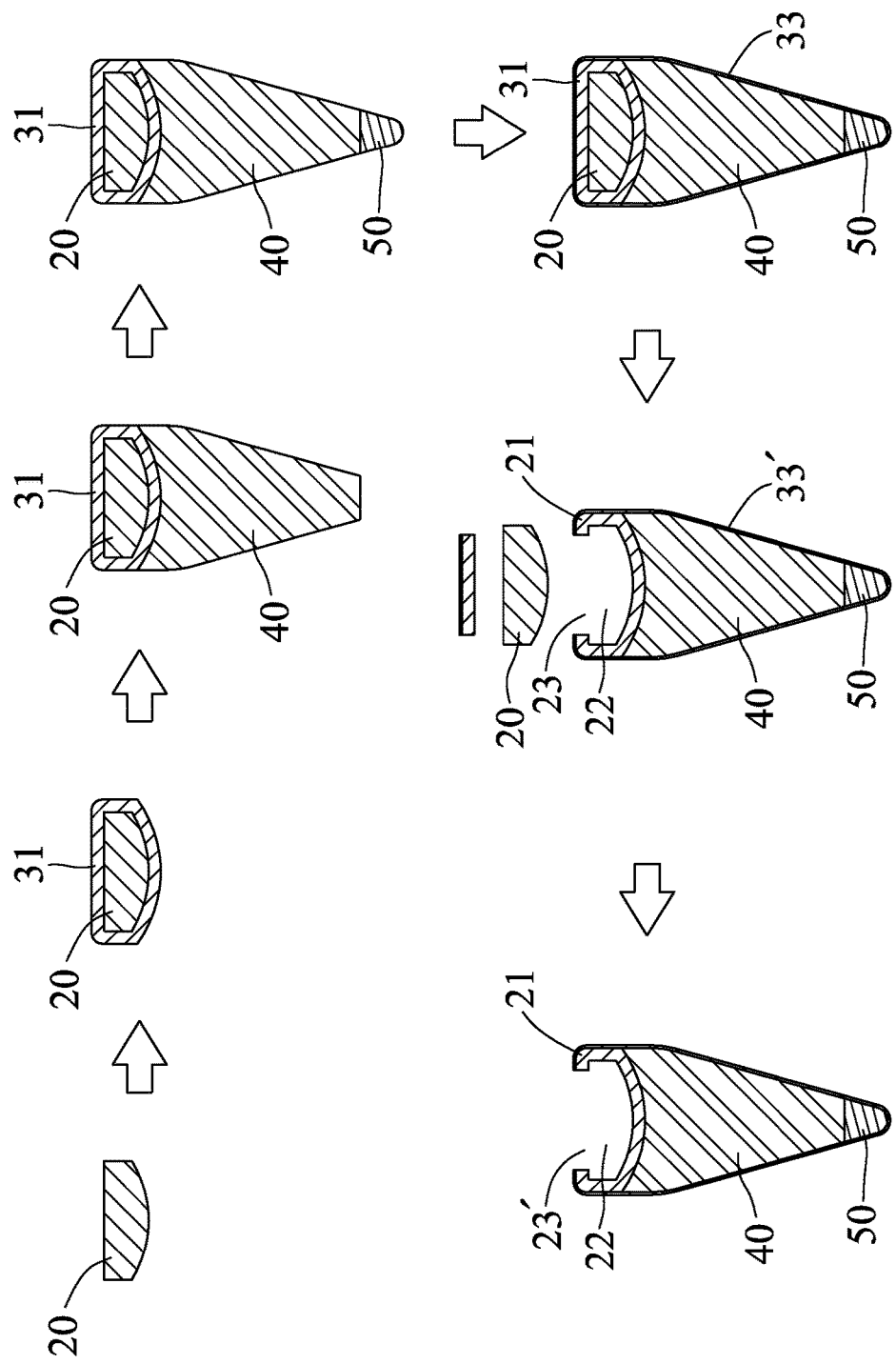
FIG. 6 is a schematic flow chart of the exemplary embodiment, illustrating sectional views in the consecutive steps of the method.

Referring to FIGS. 3 to 8, the exemplary embodiment of a method for making a carbon fiber wheel rim, which has a circular engaging seat 21 formed with a circular engaging groove 22 (see FIG. 7) for engagement with a tire (not shown), includes steps as follows:

Step 101: preparing a circular outer supporting piece 20 (see Section (a) of FIG. 3). The circular outer supporting piece 20 is made of a material having superior hardness and being susceptible to heat, such as a composite carbon fiber material. As shown in FIG. 6, the circular outer supporting piece 20 has a cross-section profile that is complementary in shape to the circular engaging groove 22.

Step 102: winding continuously and circumferentially at least one first carbon-fiber yarn 30 around the circular outer supporting piece 20 to form a plurality of first carbon fiber layers (see Sections (b) and (c) of FIG. 3). In this embodiment, the first carbon-fiber yarn 30 includes a plurality of carbon fibers, and each of the first carbon fiber layers is formed by winding the first carbon-fiber yarn 30 around an outer surface of the circular outer supporting piece 20 in a mutually-different winding angle. The circular outer supporting piece 20 and the first carbon fiber layers constitute an engaging seat preform 31.

Figure 4:
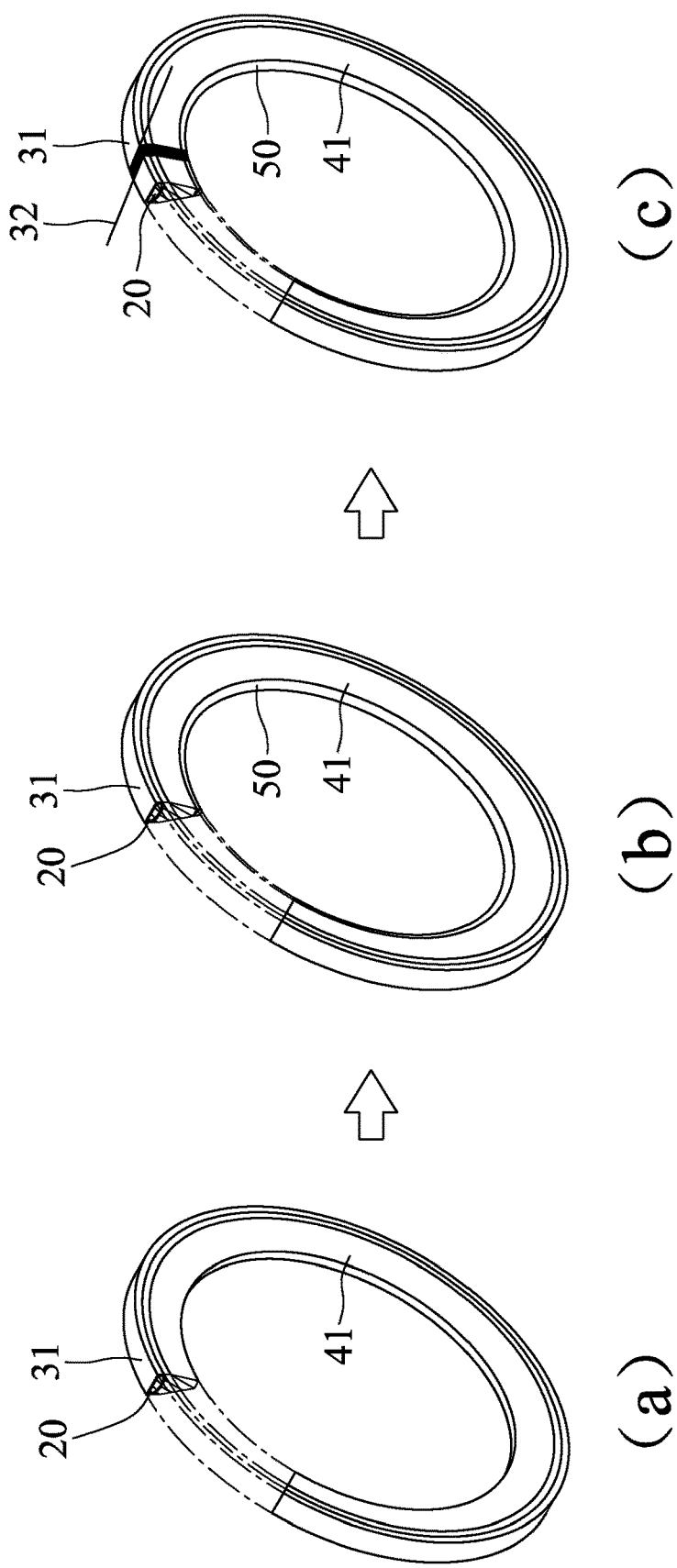

Step 103: connecting a circular inner supporting piece 40 to the engaging seat preform 31 (see Section (a) of FIG. 4). In this embodiment, the circular inner supporting piece 40 is attached to an inner side of the circular outer supporting piece 30 and is concentrically arranged with respect to the engaging seat preform 31. The circular inner supporting piece 40 may be made of a light-weight material that is susceptible to heat, such as a composite foam material. As shown in FIG. 6, the circular inner supporting piece 40 is centripetally tapered in shape and has a substantially trapezoidal cross-section.

Step 104: connecting a circular reinforcement piece 50 to the circular inner supporting piece 40 oppositely of the engaging seat preform 31, so that the engaging seat preform 31, the circular inner supporting piece 40 and the reinforcement piece 50 constitute an assembly (see Section (b) of FIG. 4). In this embodiment, the reinforcement piece 50 is attached to an inner side of the circular inner supporting piece 40 and is arranged concentrically with the circular inner supporting piece 40 and the engaging seat preform 31. As shown in FIG. 6, the reinforcement piece 50 of this embodiment is centripetally tapered in shape and has a substantially triangular cross-section, where an inner corner of the same distal from the inner supporting piece 40 is substantially rounded. The reinforcement piece 50 may be made of a material having superior hardness and being susceptible to heat, e.g., a composite carbon fiber material.

Step 105: winding continuously and circumferentially at least one second carbon-fiber yarn 32 around the assembly to form a plurality of second carbon fiber layers (see Section (c) of FIG. 4). In this embodiment, the second carbon-fiber yarn 32 includes a plurality of carbon fibers, and each of the second carbon fiber layers is formed by winding the second carbon-fiber yarn 32 around a circumferential surface of the assembly in a mutually-different winding angle.

Figure 5:
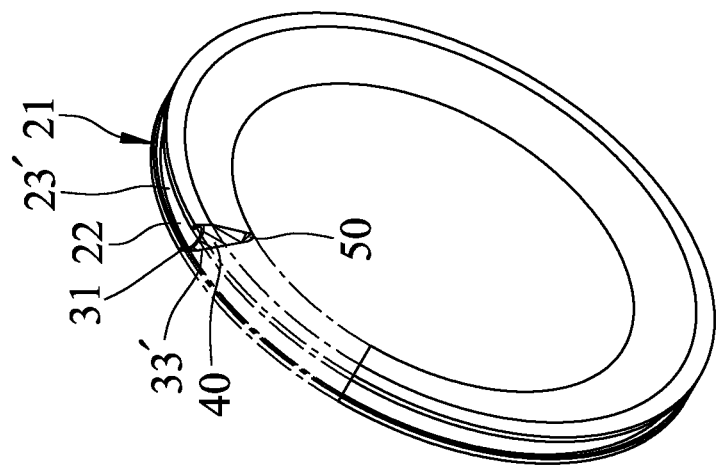
Figure 5:
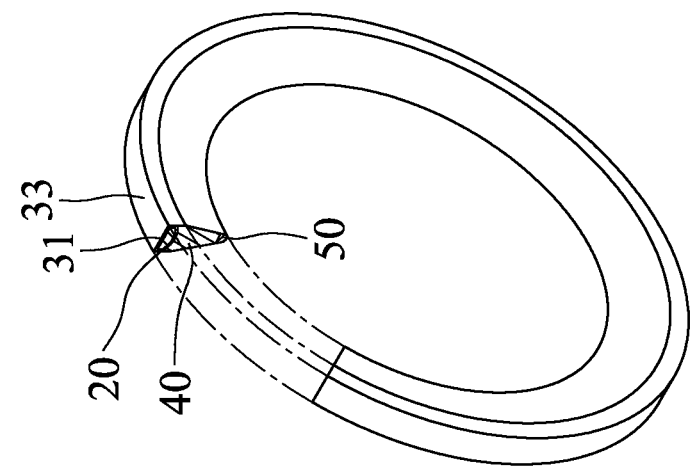

Step 106: fixing the assembly with the second carbon fiber layers to form an outer frame preform 33 on the assembly (see Section (a) of FIG. 5). The outer frame preform 33 has an annular outer surface that is distal from the circular reinforcement piece 50. In this embodiment, Step 106 may be conducted by: placing the assembly together with the second carbon fiber layers into a mold cavity; vacuuming the mold cavity; injecting a mold material (such as a thermosetting resin material) into the mold cavity; and heating the mold material so as to obtain the outer frame preform 33.

Step 107: cutting the outer frame preform 33 and the engaging seat preform 31 from the annular outer surface of the outer frame preform 33 to form a circular trench 23, followed by removing the circular outer supporting piece 20 from the circular trench 23 to form the circular engaging groove 22 of the circular engaging seat 21 and an outer frame 33' which covers the circular engaging seat 21, the inner supporting piece 40 and the reinforcement piece 50 (see Section (b) of FIG. 5 and FIG. 6). In this embodiment, the circular engaging groove 22 has a circular tire-mounting opening 23' that corresponds to the circular trench 23, and an internal space that is formed by the removal of the outer supporting piece 20. The internal space has a maximum width (W2) that is greater than a maximum width (W1) of the tire-mounting opening 23' (see FIG. 7).

Figure 7:
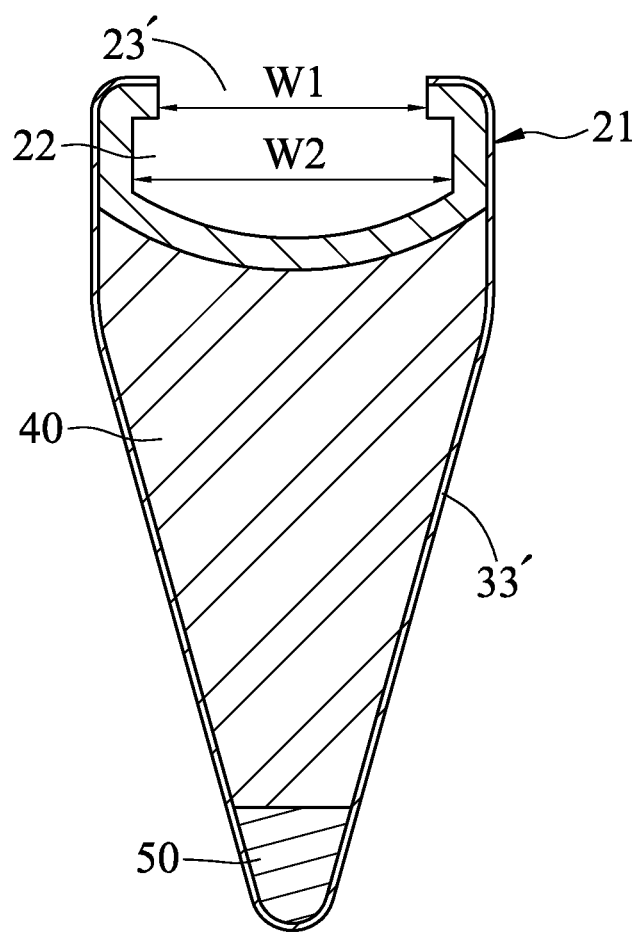
FIG. 7 is a sectional view of the wheel rim that is made by the method of the exemplary embodiment according to the present disclosure.
Figure 8:
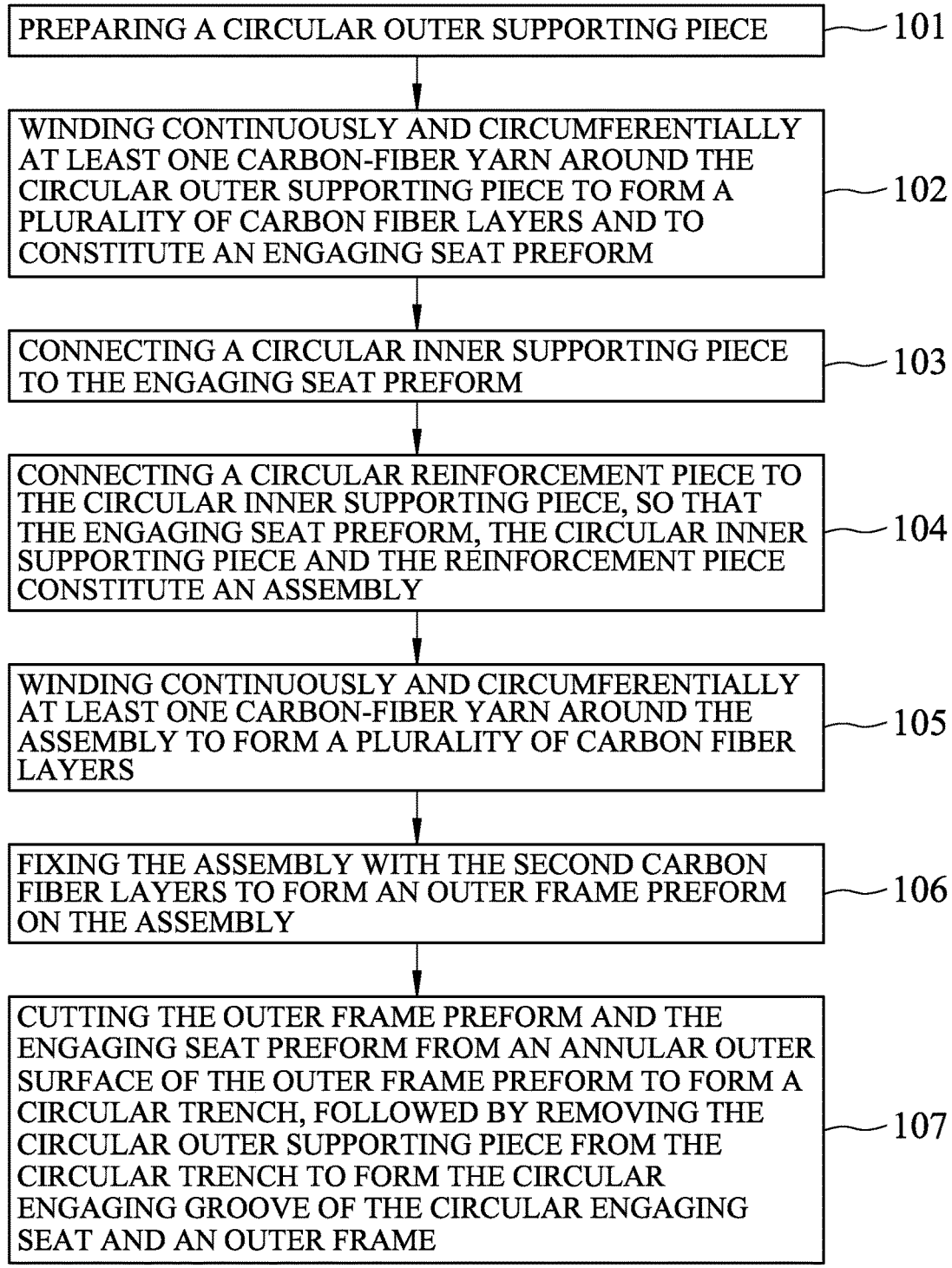
FIG. 8 is a flow chart of the exemplary embodiment, illustrating the consecutive steps thereof.

As illustrated in FIG. 7, the wheel rim obtained by the method of the exemplary embodiment includes the circular engaging seat 21, the circular inner supporting piece 40, the reinforcement piece 50 and the outer frame 33'. The circular engaging seat 21 is configured to have a substantially U-shaped cross-section and is formed with the circular engaging groove 22. As aforementioned, the circular engaging seat 21 is made by winding the first carbon-fiber yarn 30 into the first carbon-fiber layers. The circular inner supporting piece 40 is attached to the inner side of the circular engaging seat 21 and is concentrically arranged with respect to the circular engaging seat 21. The circular inner supporting piece 40 may be made of a light-weight material that is susceptible to heat, such as a composite foam material. As shown in FIG. 7, the circular inner supporting piece is centripetally tapered in shape and has a substantially trapezoidal cross-section. The reinforcement piece 50 is attached to the inner side of the circular inner supporting piece 40 and is arranged concentrically with the circular inner supporting piece 40 and the circular engaging seat 21. As shown in FIG. 7, the reinforcement piece 50 of this embodiment is centripetally tapered in shape and has a substantially triangular cross-section. The reinforcement piece 50 may be made of a material having superior hardness and being susceptible to heat, e.g., a composite carbon fiber material. The outer frame 33' cooperates with the circular engaging seat 21 to encapsulate the circular inner supporting piece 40 and the reinforcement piece 50. As aforementioned, the outer frame 33' is formed by winding the second carbon-fiber yarn 32 into the second carbon-fiber layers.

Since the circular engaging seat 21 and the outer frame 33' of the exemplary embodiment according to the present disclosure are formed by continuous winding of the first and second carbon-fiber yarns 30, 32 into the first and second carbon fiber layers, such winding can be performed by machine instead of manpower. As such, the production time and cost can be greatly reduced. Moreover, the wheel rim made by the method of the present disclosure has a uniform structural strength distribution owing to the continuous winding structure of the first and second carbon-fiber yarns 30, 32. Furthermore, the winding of the first and second carbon-fiber yarns 30, 32 provides a relatively small amount of gaps formed therebetween and may result in relatively less bubbles generated during the fixing step (i.e., Step 106) and improved production yield. Even further, the outer frame 33' is integrally formed as one piece to cover the circular engaging seat 21, the circular inner supporting piece 40 and the reinforcement piece 50, thereby further improving the overall structural strength of the wheel rim according to the present disclosure. Even further, the method of the present disclosure does not require utilization of an airbag, so that the overall process can be further simplified and accelerated.

While the disclosure has been de scribed in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for making a carbon fiber wheel rim, the carbon fiber wheel rim having a circular engaging seat formed with a circular engaging groove for engagement with a tire, the method comprising:
    preparing a circular outer supporting piece having a cross-section that is complementary in shape with the circular engaging groove;
    winding continuously and circumferentially at least one first carbon-fiber yarn around the circular outer supporting piece to form a plurality of first carbon fiber layers, each being formed by winding the first carbon-fiber yarn in a mutually-different winding angle, the circular outer supporting piece and the first carbon fiber layers constituting a circular engaging seat preform;
    connecting a circular inner supporting piece to the circular engaging seat preform;
    connecting a circular reinforcement piece to the circular inner supporting piece oppositely of the circular engaging seat preform so that the circular engaging seat preform, the circular inner supporting piece and the circular reinforcement piece constitute an assembly;
    winding continuously and circumferentially at least one second carbon-fiber yarn around the assembly to form a plurality of second carbon fiber layers, each being formed by winding the second carbon-fiber yarn in a mutually-different winding angle;
    fixing the assembly with the second carbon fiber layers to form an outer frame preform on the assembly, the outer frame preform having an outer circular surface distal from the circular reinforcement piece; and
    removing part of the outer frame preform and part of the circular engaging seat preform to form a circular trench, followed by removing the circular outer supporting piece from the circular trench to form the circular engaging groove of the circular engaging seat and an outer frame.

2. The method of claim 1, wherein the circular outer supporting piece is made of a composite carbon fiber material.

3. The method of claim 1, wherein the circular inner supporting piece is made of a composite foam material.

4. The method of claim 1, wherein the reinforcement piece is made of a composite carbon fiber material.

5. The method of claim 1, wherein the step of shaping the assembly and the second carbon fiber layers includes:
    placing the assembly and the second carbon fiber layers into a mold cavity;
    vacuuming the mold cavity;
    injecting a mold material into the mold cavity; and
    heating the mold material.

6. The method of claim 1, wherein each of the first and second carbon-fiber yarns includes a plurality of carbon fibers.

7. The method of claim 1, wherein the circular inner supporting piece is centripetally tapered in shape.

8. The method of claim 1, wherein the circular reinforcement piece is centripetally tapered in shape.

9. The method of claim 1, wherein the circular engaging groove has an circular tire-mounting opening that corresponds to the circular trench, and an internal space that is formed by the removal of the outer supporting piece and that has a maximum width greater than a maximum width of the tire-mounting opening.

* * * * *